United States Patent
Chae

(10) Patent No.: US 11,448,412 B2
(45) Date of Patent: Sep. 20, 2022

(54) AIR CONDITIONER WITH AN ARTIFICIAL INTELLIGENCE

(71) Applicant: LG ELECTRONICS INC., Seoul (KR)

(72) Inventor: Jonghoon Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 328 days.

(21) Appl. No.: 16/492,714

(22) PCT Filed: Apr. 2, 2019

(86) PCT No.: PCT/KR2019/003836
§ 371 (c)(1),
(2) Date: Sep. 10, 2019

(87) PCT Pub. No.: WO2020/204221
PCT Pub. Date: Oct. 8, 2020

(65) Prior Publication Data
US 2021/0190361 A1    Jun. 24, 2021

(51) Int. Cl.
| | |
|---|---|
| *F24F 11/00* | (2018.01) |
| *F24F 11/63* | (2018.01) |
| *F24F 11/79* | (2018.01) |
| *G06N 3/08* | (2006.01) |
| *F24F 1/0007* | (2019.01) |

(Continued)

(52) U.S. Cl.
CPC ........... *F24F 11/63* (2018.01); *F24F 1/0007* (2013.01); *F24F 11/62* (2018.01); *F24F 11/79* (2018.01); *G06N 3/08* (2013.01); *F24F 2110/10* (2018.01); *F24F 2120/00* (2018.01); *F24F 2120/12* (2018.01); *F24F 2120/20* (2018.01)

(58) Field of Classification Search
CPC ........ F24F 11/63; F24F 11/79; F24F 2120/00; F24F 2120/12; F24F 2120/20
See application file for complete search history.

(56) References Cited

U.S. PATENT DOCUMENTS

| | | | | |
|---|---|---|---|---|
| 5,478,276 | A | * | 12/1995 | Lee .......................... F24F 11/30 454/256 |
| 2014/0337257 | A1 | | 11/2014 | Chatterjee et al. |

(Continued)

FOREIGN PATENT DOCUMENTS

| | | | |
|---|---|---|---|
| JP | 2016-109422 A | | 6/2016 |
| KR | 10-2018-0112653 A | | 10/2018 |

(Continued)

*Primary Examiner* — Jonathan Bradford
(74) *Attorney, Agent, or Firm* — Birch, Stewart, Kolasch & Birch, LLP

(57) ABSTRACT

Discussed is an air conditioner disposed in an indoor space. The air conditioner includes a sensor, a memory configured to store a plurality of learning results respectively corresponding to a plurality of members, and a processor configured to identify at least one member that is present in the indoor space among the plurality of members by using data acquired by the sensor, control operation of at least one of a compressor, a fan motor, or a vane motor based on the learning result corresponding to an identified member so as to adjust a set value including at least one of a set temperature, an air volume, or a wind direction, and update the learning results by using feedback on the adjusted set value.

18 Claims, 10 Drawing Sheets

(51) Int. Cl.
  *F24F 11/62* (2018.01)
  *F24F 120/00* (2018.01)
  *F24F 120/20* (2018.01)
  *F24F 110/10* (2018.01)
  *F24F 120/12* (2018.01)

(56) References Cited

U.S. PATENT DOCUMENTS

| | | | |
|---|---|---|---|
| 2016/0161137 A1 | 6/2016 | Chen et al. | |
| 2017/0051937 A1* | 2/2017 | Toyoshima | F24F 11/62 |
| 2018/0283723 A1 | 10/2018 | Ock et al. | |
| 2018/0315327 A1* | 11/2018 | Kozloski | G09B 5/00 |
| 2019/0086110 A1* | 3/2019 | Okita | G05D 23/1917 |
| 2019/0101305 A1* | 4/2019 | Hada | F24F 11/65 |
| 2019/0187635 A1* | 6/2019 | Fan | F24F 11/63 |
| 2019/0368762 A1 | 12/2019 | Kim et al. | |

FOREIGN PATENT DOCUMENTS

| | | |
|---|---|---|
| KR | 10-2019-0008480 A | 1/2019 |
| WO | WO 2018/117344 A1 | 6/2018 |

* cited by examiner

AIR CONDITIONER WITH AN ARTIFICIAL INTELLIGENCE

CROSS REFERENCE TO RELATED APPLICATIONS

This application is the National Phase of PCT International Application No. PCT/KR2019/003836, filed on Apr. 2, 2019, which is hereby expressly incorporated by reference into the present application.

TECHNICAL FIELD

The present invention relates to an air conditioner that recognizes a user within a cooling space to provide personalized cooling and is evolved using user feedback.

BACKGROUND ART

Artificial intelligence is a field of computer engineering and information technology involving studying how computers can think, learn and self-develop in ways similar to human intelligence, and means that computers can emulate intelligent actions of humans.

In addition, artificial intelligence does not exist by itself but is directly or indirectly associated with the other fields of computer science. In particular, many attempts have been made to introduce elements of artificial intelligence into various fields of information technology.

Meanwhile, techniques for recognizing and learning surrounding situations by using artificial intelligence, providing information desired by the user in a desired form, or performing a desired operation or function are being actively studied.

One family may be constituted by a plurality of members, and the optimized cooling method may be different for each member.

However, in recent years, since the cooling is performed regardless of who is present in a cooling space, there has been a problem in that the cooling may not be performed optimally for the members that are present in the cooling space.

DISCLOSURE OF THE INVENTION

Technical Problem

The present invention has been made to solve the above problem, and an object of the present invention is to provide an air conditioner that recognizes a user within a cooling space to provide personalized cooling and is evolved using user feedback.

Also, an object of the present invention is to provide an air conditioner that is capable of providing customized cooling according to a priority of a member when a plurality of members in a cooling space are identified.

Also, an object of the present invention is to provide an air conditioner that is capable of determining use of a space in which the air conditioner is installed and providing customized cooling according to use thereof.

Technical Solution

An air conditioner according to an embodiment of the present invention identifies members in an indoor space, adjusts a set value on the basis of learning results corresponding to the identified members, and updates the learning results by using feedback on the adjusted set value.

An air conditioner according to an embodiment of the present invention adjusts a set value according to a reinforcement learning model corresponding to a number having the highest priority when a plurality of members in an indoor space are identified.

An air conditioner according to an embodiment of the present invention provides customized cooling according to priorities of members in a common space and adjusts a set value by using a reinforcement learning model corresponding to a main member in a private space.

Effects of the Invention

According to the present invention, there may be the advantage that the cooling is capable of being performed in consideration of the cooling preference of the members present in the indoor space.

Also, according to the present invention, there may be the advantage that various levels of the reward or penalty are given by using the feedback on the reaction of the members to perform the reinforcement learning and to recommend the cooling method by accurately reflecting the tendency of the user.

Also, according to the present invention, there may be the advantage that the reinforcement learning is continuously performed whenever the cooling is performed to continuously enhance the performance of the reinforcement learning model.

The present invention may be advantageous in that the priority of the plurality of members is set, and the cooling preference is considered according to the priority to maximally satisfy the plurality of members.

According to the present invention, a cooling system that best meets the use of the space, in which the air conditioner is installed, and the user's intension according to the use of the space may be provided.

MODE FOR CARRYING OUT THE INVENTION

Figure 1:
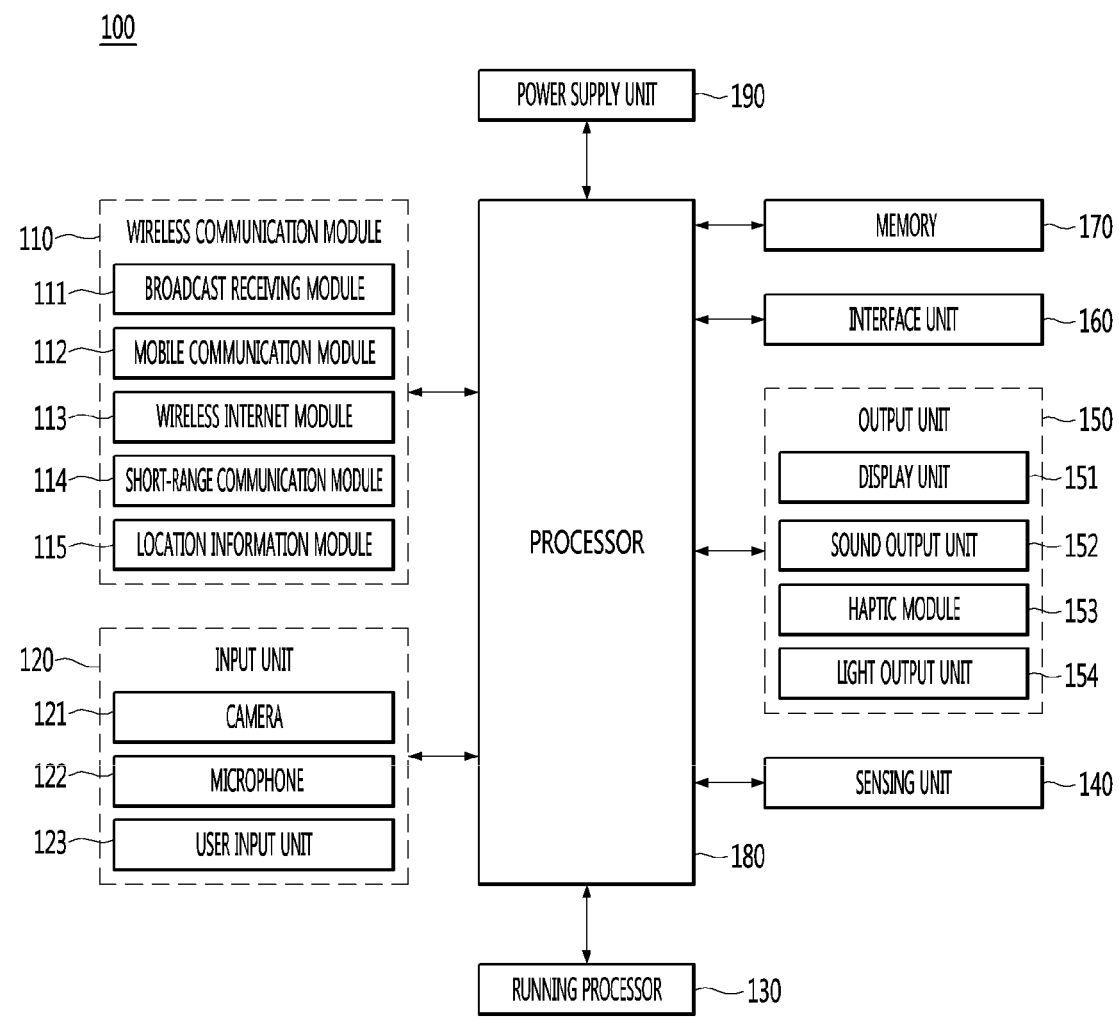
FIG. 1 is a block diagram illustrating a configuration of a terminal 100 according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail.

Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The deep neural network (DNN) including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes several parameters to be determined through the learning.

For example, the hyperparameter may include an initial weight value between the nodes, an initial deflection value between the nodes, a mini-batch size, the number of learning repetition, a learning rate, and the like. Also, the model parameter may include a weight between the nods, a deflection between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of a terminal 100 according to an embodiment of the present invention.

The terminal 100 may be implemented for a television (TV), a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, a desktop computer, fixed equipment such as a digital signage, movable equipment, and the like.

That is, the terminal 100 may be implemented in various household appliances used in the home and may be applied to fixed or movable robots.

The terminal 100 may perform a function of a voice agent. The voice agent may be a program for recognizing a voice of the user and outputting a voice corresponding to the recognized voice of the user.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model composed of the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technique, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio input/output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
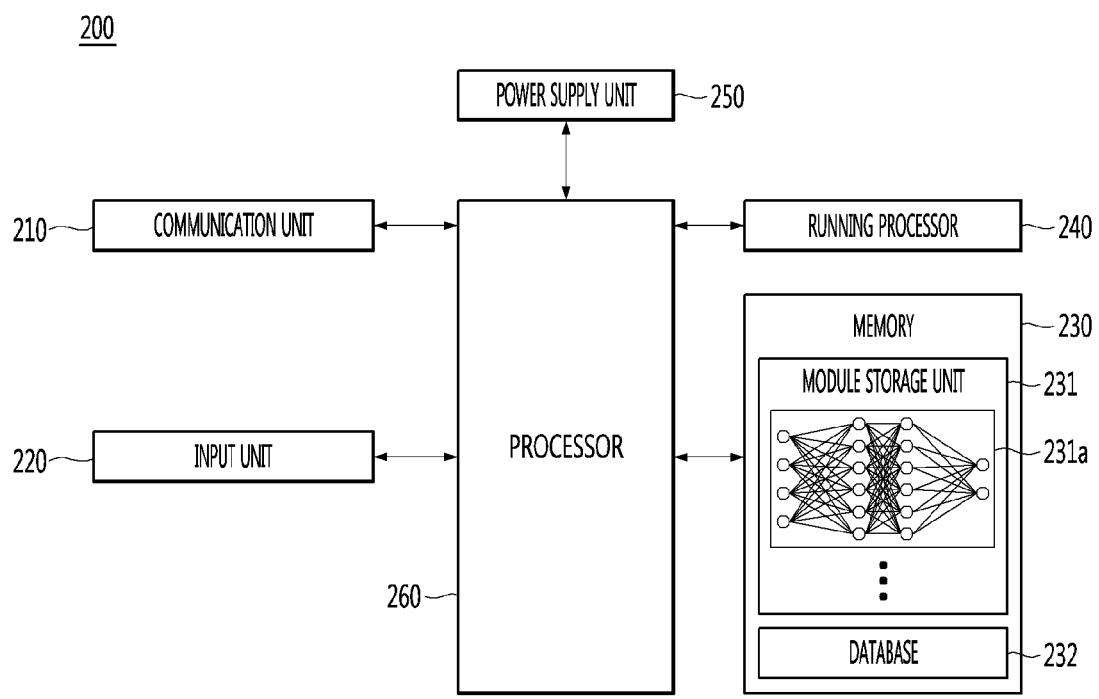
FIG. 2 is a block diagram illustrating a configuration of a learning device 200 of an artificial neural network according to an embodiment of the present invention.

FIG. 2 is a block diagram illustrating a configuration of the learning device 200 of the artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor, 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage part 231 and a database 232.

The model storage part 231 may store a model being learned or a learned model (or an artificial neural network 231a) through the learning processor 240 to store the updated model when the model is updated through the learning.

Here, the model storage part 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

Next, an air conditioner 700 as an example of the terminal 100 described with reference to FIG. 1 will be described.

That is, the air conditioner 700 may include one or more configurations and one or more functions of the terminal 100 described in FIG. 1. Also, the air conditioner 700 according to an embodiment of the present invention may include one or more configurations and one or more functions of the terminal 200 described in FIG. 2.

Thus, the term "terminal 100" may be used interchangeably with the term "air conditioner 100".

The air conditioner is installed to provide a more comfortable indoor environment for humans by discharging cold air into an indoor space to control an indoor temperature and purifying indoor air to create a comfortable indoor environment.

Figure 3:
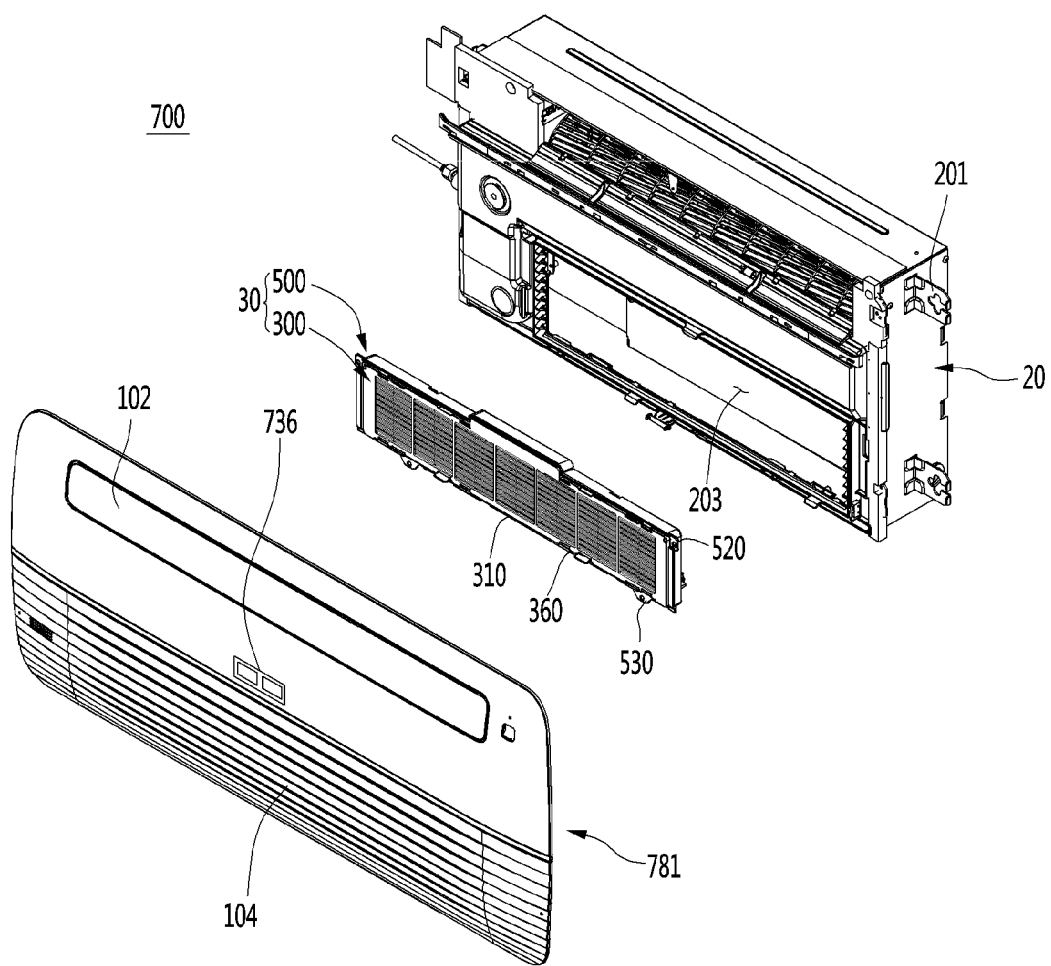
FIG. 3 is an exploded perspective view of an air conditioner according to an embodiment of the present invention.
Figure 4:
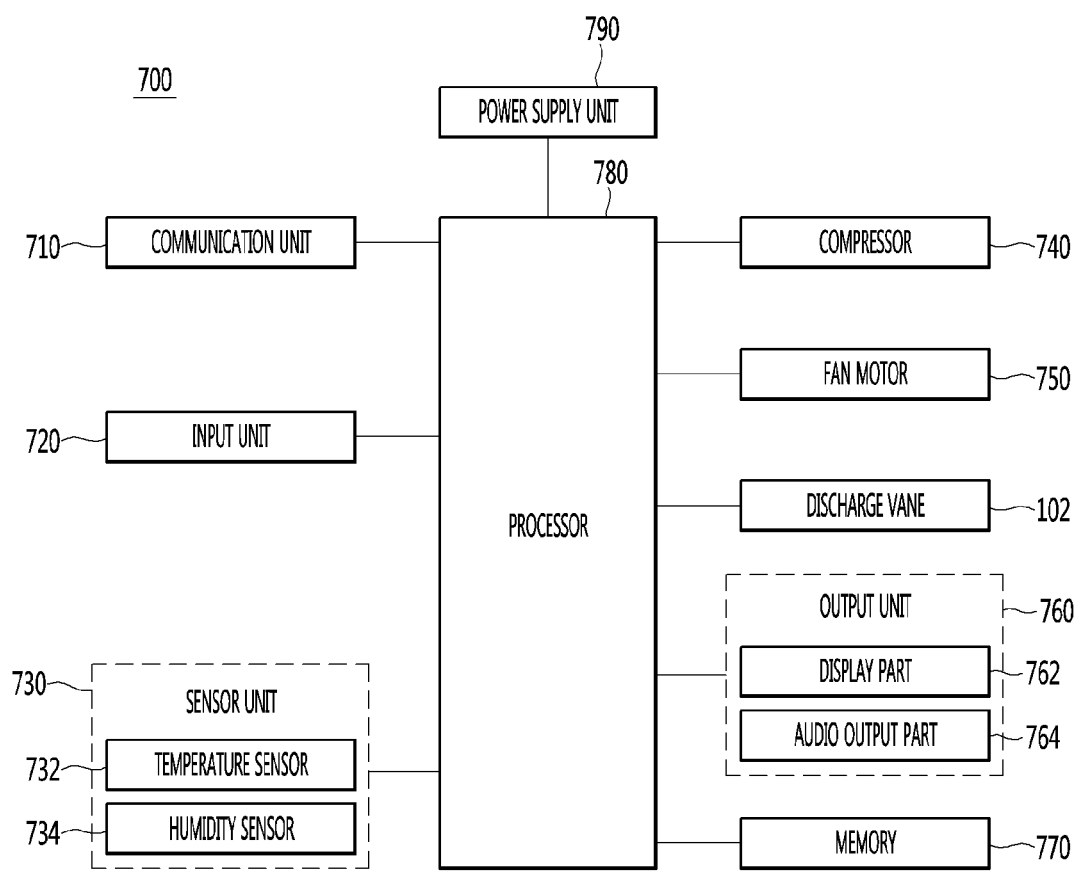
FIG. 4 is a schematic block diagram of components provided in the air conditioner according to an embodiment of the present invention.

Although an air conditioner is described as an example of the air conditioner of FIGS. 3 and 4, the present invention is not limited thereto.

FIG. 3 is an exploded perspective view of the air conditioner according to an embodiment of the present invention.

Although a ceiling-type air conditioner is described as an example according to various embodiments in FIG. 3, the embodiments are not limited to the ceiling-type air conditioner. For example, the embodiments of the present invention may be applied to air conditioners having various shapes such as a stand-type, a wall mounting-type, and the like.

An outer appearance of the air conditioner illustrated in FIG. 3 is merely an example for convenience of description, and the outer appearance of the air conditioner according to an embodiment of the present invention is not limited thereto.

Referring to FIG. 3, the air conditioner 700 according to an embodiment of the present invention may include a casing. Here, the casing may include a main body casing 20 and a front panel 781.

The casing may be fixed to a ceiling or a wall and also may suction external air and discharge heat-exchanged air.

The main body casing 20 may include a fixing member 201 fixing the main body casing 20. To closely attach the main body casing 20 to the ceiling or the wall, the fixing member 201 may be fixed by a coupling member, for example, a bolt (not shown).

A plurality of components may be disposed in an inner space of the main body casing 20. The plurality of components may include a heat exchanger (not shown) that heat-exchanges air suctioned from the outside and a blower fan (not show) that discharges the heat-exchanged air to the outside.

The air conditioner 70 may further include the front panel 781 coupled to a lower portion of the main body casing 20. For example, when the main body casing 20 is embedded in the ceiling by a ceiling embedding member such as a gypsum board or the like, the front panel 781 may be disposed at a height of the ceiling and thus be exposed to the outside. The air conditioner 700 may have an overall outer appearance defined by the main body casing 20 and the front panel 781.

The casing may include a suction hole through which indoor air is suctioned and a discharge hole through air heat-exchanged in the air conditioner 70 is discharged to the indoor space.

Also, the front panel 781 may further include a suction grill 104 that prevents foreign substances contained in the air suctioned through the suction hole from being introduced. The suction grill 104 may be coupled to be separable from the suction hole.

The suction hole may be defined to be long in a front portion of the front panel 781 in a transverse direction, and the discharge hole may be defined to long in a rear portion of the front panel 781 in the transverse direction.

The casing may further include a discharge vane 102 that is movably provided in the discharge hole. The discharge vane 102 may adjust an amount or volume of air discharged through the discharge hole.

Particularly, the air conditioner 700 may include a vane motor that operates the discharge vane.

Also, the discharge vane 102 may be provided to be rotatable in vertical and horizontal directions with respect to a hinge shaft (not shown).

Also, the discharge vane 102 may receive a driving force from the vane motor to rotate in the vertical and horizontal directions, thereby adjusting the wind direction.

In the air conditioner 700, when the blower fan is driven, the air in the indoor space may be suctioned into the casing through the suction hole. Also, the air suctioned into the casing may be heat-exchanged in the heat exchanger. Also, the air passing through the heat exchanger may be discharged into the indoor space through the discharge hole of the casing.

The main body casing 20 may include a suction hole 203 defined to communicate with the suction hole defined in the front surface of the front panel 781. Also, the air conditioner 700 may include a filter assembly 30 disposed on the suction hole 203. The filter assembly 30 may filter the foreign substances such as dusts contained in the air introduced into the air conditioner 700 to minimize a content of foreign substance contained in the air discharged through the discharge hole.

The air conditioner may include a compressor, which receive a refrigerant to compress the refrigerant, a condenser, an expansion device, and evaporator. Thus, the air conditioner may have a refrigerant cycle in which compression, condensation, expansion, and evaporation processes of the refrigerant are performed. Thus, the air conditioner may heat or cool the inner space.

Hereinafter, the components provided in the air conditioner according to an embodiment of the present invention will be described.

FIG. 4 is a schematic block diagram of the components provided in the air conditioner according to an embodiment of the present invention.

Referring to FIG. 4, the air conditioner 700 may include a communication unit 710, an input unit 720, a sensor unit 730, a compressor 740, a fan motor 750, an output unit 760, a memory 770, a processor 780, and a power supply unit 790. The components of FIG. 4 are not essential components for embodying the air conditioner. That is, the air conditioner described in this specification may further include additional components in addition to the above-described components, or some of the above-described components may be omitted in the air conditioner described in this specification.

In more detail, the communication unit 710 of the components may include one or more modules that wirelessly or wiredly communicate between the air conditioner 700 and external devices (for example, a movable air conditioner such as a moving agent, a smartphone, a tablet PC or a fixed air conditioner such as desktop computer) or between the air conditioner and an external server.

Also, the communication unit 710 may include one or more module connecting the air conditioner 700 to one or more networks.

When the communication unit 710 supports wireless communication, the communication unit 710 may include at least one of a wireless Internet module or a short-range communication module.

The wireless Internet module may be a module for wireless Internet access. The wireless Internet module 303 may be embedded in the air conditioner 700 or installed in an external device.

The wireless Internet module may transmit and receive a wireless signal in a communications network based on wireless Internet technologies. Examples of the wireless Internet technologies include wireless LAN (WLAN), wireless fidelity (Wi-Fi), wireless fidelity (Wi-Fi) direct, and digital living network alliance (DLNA).

The short-range communication module may be for short-range communication. The short-range communication module may support the short-range communication by using at least one of technologies such as Bluetooth™, infrared data association (IrDA), ZigBee, and short-range communication (NFC), and the like. The short-range communication module may support the wireless communication between the air conditioner 700 and the external devices through the wireless area networks. The wireless area networks may be a wireless personal area networks.

The communication unit 710 may communicate with the moving agent in various communication manners under the control of the processor 780.

The input unit 720 may include a touch key, a mechanical key, a dial key, and the like, which receive information or a command from a user. According to an embodiment, the input unit 720 may be understood as a concept including an interface unit that receives information or commands from a separate remote control device.

Particularly, the input unit 720 may receive information from the user. When information is inputted through the input unit 720, the processor 780 may control an operation of the air conditioner 700 to correspond to the input information.

The input unit 720 may include a mechanical input unit (or a mechanical key, for example, a button disposed on a front, rear, or side of the air conditioner 700, a dome switch, a jog wheel, a jog switch, and the like) and a touch-type input unit.

The touch input unit may include a virtual key, a soft key, or a visual key which is displayed on a touch screen through a software process, or a touch key disposed on a portion other than the touch screen.

The virtual key or the visual key may be displayed on the touch screen with various forms, for example, a graphic, a text, an icon, a video, or a combination thereof.

The sensing unit 730 may include one or more sensors for sensing at least one of surrounding information around the air conditioner 700 and user information.

For example, the sensor unit 730 may include a temperature sensor 732 detecting a temperature of a space in which the air conditioner 700 is installed and a humidity sensor 734 detecting humidity of the space.

The output unit 760 may generate an output related to a visual, auditory, and the like. The output unit 150 may include at least one of a display part 762 or an audio output part 764 (for example, a speaker).

The display part 762 may form a layered structure together with a touch sensor or be integrated with the touch sensor to realize a touch screen. The touch screen may serve as an input part 720 that provides an input interface between the air conditioner 700 and the user and also provide an output interface between the air conditioner 700 and the user.

The display part 762 may display various pieces of information related to the operation of the air conditioner 700. For example, the display part 762 may display information such as a set temperature, an air volume, an wind direction, a current room temperature, and humidity of the air conditioner 700 and information about an operation mode such as a power saving mode, a normal mode, a sleep mode, and the like.

The audio output part 764 may output a signal in the form of a voice to inform an occurrence of an event of the air conditioner 700. Examples of the event generated by the air conditioner 700 may include an alarm, power on/off, an error occurrence, an operation mode change, and the like The memory 770 stores data that supports various functions of the air conditioner 700. The memory 770 may store various data and instructions for the operation of the air conditioner 700.

The memory 770 may include at least one type of storage medium of a flash memory type, a hard disk type, a solid state disk type, a silicon disk drive type (SDD type), a multimedia card micro type, a card type memory (e.g., SD or XD memory), a random access memory (RAM), a static random access memory (SRAM), a read-only memory (ROM), an electrically erasable programmable read memory, a programmable read-only memory (PROM), a magnetic memory, a magnetic disk, and an optical disk.

The processor 780 typically controls an overall operation of the air conditioner 700. The processor 780 may provide or process information or a function that is appropriate for the user by processing signals, data, or information inputted or outputted through the above-described components.

The processor 780 may adjust at least one of the compressor 740, the fan motor 750, or the vane motor on the basis of an action outputted by the reinforcement learning model. The action outputted by the reinforcement learning model may include at least one of a set temperature, an volume, or an wind direction.

The fan motor 750 may be installed inside the casing and may blow air by rotating the blower fan (not shown) provided inside the casing.

That is, when the fan motor 750 is driven, the blower fan rotates, and as the blower fan rotates, air is suctioned through the suction hole, and the suctioned air may be discharged through the discharge hole.

For example, the processor 780 may control an operation of the compressor 740 on the basis of the set temperature among the actions outputted by the reinforcement learning model. Also, the set temperature of the air conditioner 780 may be adjusted as the operation of the compressor 740 is controlled.

Also, the processor 780 may control the operation of the fan motor 750 on the basis of the air volume among the actions outputted by the reinforcement learning model. Also, as the operation of the fan motor 750 is controlled, the air volume of the air conditioner 780 may be adjusted.

Also, the processor 780 may control an operation of the vane motor on the basis of the wind direction among the actions outputted by the reinforcement learning model. As the operation of the vane motor is controlled, the wind direction of the air conditioner 780 may be adjusted.

The power supply unit 790 may receive power from an external power source or an internal power source under the control of the processor 780 to supply the power to each of the components of the air conditioner 700.

At least a portion of the components may cooperate with each other to realize the operation, control, or control method of the air conditioner according to various embodiments that will be described below. Also, the operation, control, or control method of the air conditioner may be realized in the air conditioner by the driving of at least one application program stored in the memory 770.

Figure 5:
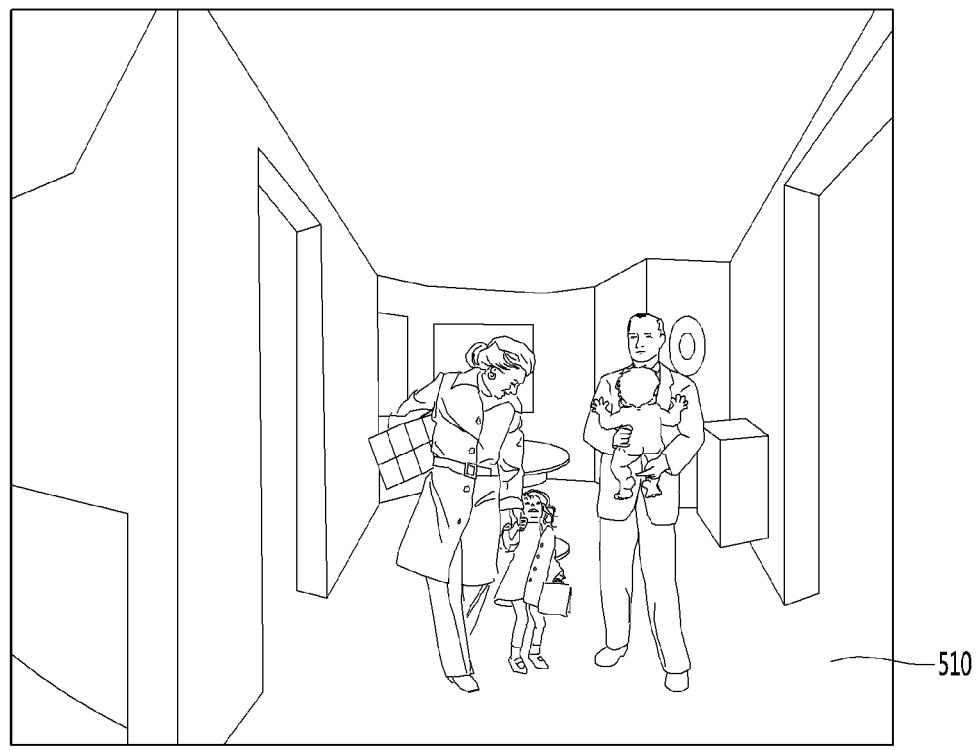
FIG. 5 is a view for explaining problems that may occur when the air conditioner is installed in an indoor space used by a plurality of members.

FIG. 5 is a view for explaining problems that may occur when the air conditioner is installed in the indoor space used by a plurality of members.

The air conditioner is often disposed in the indoor space 510 used by a plurality of members.

Examples of the indoor space 510 may include an office used by multiple members in a company or a home used by multiple family members.

That is, the plurality of members may be users who use one indoor space and may be, for example, a dad, a mother, a son, and a daughter, which constitute a family.

A cooling preference may vary for each member. For example, infants may prefer to cool the room slowly without directly contact considered air, while a feverish and fat father may prefer direct cold wind.

Thus, it is necessary to make the cooling method differently depending on who is present in the indoor space.

Also, if there are a plurality of members having different cooling references in the indoor space, there may be a need to mediate the cooling method.

Also, it is necessary to determine which member to perform cooling based on the cooling taste of the member according to whether the space provided with the air conditioner is a common space or a private space.

Figure 6:
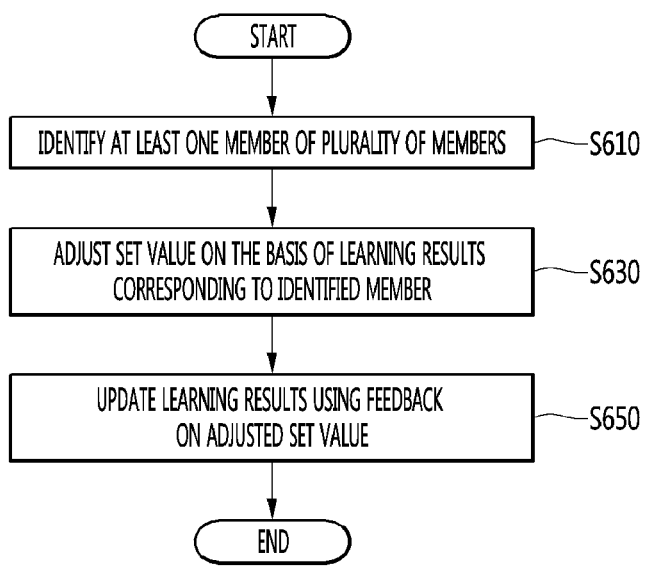
FIG. 6 is a view for explaining an operation method of the air conditioner according to an embodiment of the present invention.

FIG. 6 is a view for explaining an operation method of the air conditioner according to an embodiment of the present invention.

An operation method of the air conditioner according to an embodiment of the present invention may include a process (S610) of identifying at least one member of a plurality of members by using data for identifying the members, a process (S630) of controlling an operation of at least one of a compressor, a fan motor, or a vane motor on the basis of a learning result corresponding to the identified member to adjust a set value including at least one of a set temperature, an air volume, or an wind direction, and a process (S650) of updating the learning result by using feedback on the adjusted set value.

First, the process (S610) of identifying at least one member of the plurality of members by using data for identifying the members will be described.

A sensing unit 140 of an air conditioner 100 may acquire the data for identifying the members. Particularly, a camera may acquire an image obtained by capturing an image of an indoor space. Also, a microphone may acquire sounds collected in the indoor space.

Although only images and sounds are described, but not limited thereto. For example, all data capable of being used to identify the members may be collected.

A processor 180 of the air conditioner 100 may identify at least one member of the plurality of members by using the data for identifying the members.

Particularly, the processor 180 may distinguish a plurality of members on the basis of a size, appearance, behavior pattern, voice in the received sound, etc. of the person in the captured image. The method of identifying the members may be the conventional technology, and thus, a detailed description thereof will be omitted.

Also, the processor 180 of the air conditioner 100 may use the data for identifying the members to obtain a position of the identified member. For example, the processor 180 of the air conditioner 100 may determine the position of the identified member in the indoor space on the basis of the position of the identified person in the captured image, a direction in which the voice is received, an intensity of the voice, and the like. The method of determining the position of the member may be the conventional technology, and thus, a detailed description thereof will be omitted.

Also, the processor 180 may determine who of the plurality of members is present in the current indoor space.

For example, the processor 180 may determine that the mother and the son are present in the current indoor space among the plurality of members of the father, mother, elementary school student daughter, and infant son.

Meanwhile, the identification of the members that are present in the indoor space may be performed by a recognition model.

Particularly, the recognition model may be a neural network that has been pre-trained to classify gender, generation (infant, child, teenager, youth, mature, elderly, etc.) In this case, the training data may be data for identifying the above-described members such as the video or the audio.

Also, when the data for identifying the members is received, the processor 180 may input the data for identifying the members into the recognition model. In this case, as the recognition model outputs a result value of classifying the members according to gender, generation, etc., the processor 180 may identify the members present in the indoor space.

The recognition model may be updated using the data for identifying the members. Particularly, the processor 180 of the air conditioner 100 may change model parameters of the recognition model by retraining the recognition model as training data using the data for identifying the members.

The processor 180 of the air conditioner 100 may control the operation of at least one of the compressor, the fan motor, or the vane motor on the basis of the learning results corresponding to the identified members to adjust the set value including at least one of the set temperature, the air volume, or the wind direction.

This will be described below in with reference to FIGS. 7 to 9.

Figure 7:
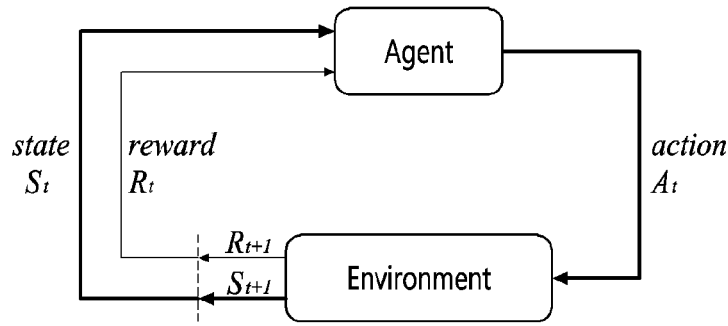
FIG. 7 is a view for explaining a reinforcement learning model used in the present invention.

FIG. 7 is a view for explaining the reinforcement learning model used in the present invention.

The processor 180 may provide a state to the reinforcement learning model mounted in the air conditioner.

Particularly, reinforcement learning is a theory in which the best manner is found through experience without data if an environment where an agent is capable of determining what to do every moment is given.

The reinforcement learning may be performed primarily by a Markov decision process (MDP).

In the Markov decision process (MDP), first, the environment, in which information necessary for the agent to perform the following actions is configured, is given; second, the agent defines how to act based on the state in the environment; third, what the agent does well to reward and if not, penalty, is defined; and fourth, the experience is repeated until the reward reaches its highest point to derive optimal policy.

When applying the Markov decision process to the present invention, the agent may mean an air conditioner, more specifically, the reinforcement learning model.

Also, first, in the present invention, an environment in which information necessary for the agent (reinforcement learning model) to perform the next action may be given, i.e., the indoor space in which the air conditioner is disposed may be provided.

Also, second, in the present invention, how the agent (reinforcement learning model) acts based on the given state (e.g., current temperature, target temperature, current set temperature, current wind direction, and current wind speed, etc.) may be defined, i.e., how the agent sets the set value of the air conditioner (set temperature, wind direction, air speed, etc.) may be determined.

Also, third, the agent (reinforcement learning model) may give reward when setting the set value of the air conditioner according to the user's cooling preference and give penalty when the set value is not set according to the user's cooling preference. In this case, the agent (reinforcement learning model) may update parameters of the neural network on the basis of the reward and the penalty.

Also, fourth, the agent (reinforcement learning model) may be repeatedly experienced until the future reward reaches its peak to allow the user to recommend optimum policy, i.e., an optimum set value of the air conditioner.

The reinforcement learning model may be mounted on the air conditioner 100.

The reinforcement learning model may be implemented as hardware, software, or a combination of the hardware and the software. When a portion or the whole of the trained model is implemented as the software, one or more commands constituting the reinforcement learning model may be stored in the memory 170.

Also, the reinforcement learning model may be composed of the neural network, and the parameters of the reinforcement learning model, that is, the parameters of the neural network, may be updated using the feedback of the members.

Also, as the neural network 1030 is trained, the learning results obtained using the feedback according to the actions and actions of the reinforcement learning model may be stored in the memory.

That is, the learning results may mean parameters of the reinforcement learning model that is updated by using the feedback of the members. The learning results may form a portion of the neural network that constitutes the reinforcement learning model.

Here, the state may include at least one of a current temperature, a target temperature, a current set temperature, or a position of the identified member.

Here, the current temperature may mean a temperature of the indoor space disposed in the air conditioner, and the target temperature may mean a target value to which the temperature of the indoor space has to reach.

Also, the reinforcement learning model may output an action (the set value including at least one of a set temperature, an wind direction, and a wind speed) as a result value based on the state.

For example, it is assumed that the mother prefers quick cooling when a difference between the current temperature and the target temperature is large and prefers one-way cooling when the current temperature and the target temperature is small, and also the mother does not like direct wind from the air conditioner.

Also, there is a reinforcement learning model that is trained according to the cooling preferences of the mother.

Also, if the state (at least one of the current temperature, the target temperature, or the mother's position) is inputted into the reinforcement learning model that is trained to match the cooling preference of the mother, the reinforcement learning model may output the set value (set temperature, wind direction, and wind speed of the air conditioner) corresponding to the cooling preference of the mother on the basis of the current temperature, the target temperature, and the position of the mother.

For another example, it is assumed that the father prefers quick cooling regardless of the difference between the current temperature and the target temperature and that very cold winds come in direct contact with the body.

Also, there is a reinforcement learning model trained according to the cooling preference of the father.

Also, if the state (at least one of the current temperature, the target temperature, or the father's position) is inputted into the reinforcement learning model that is trained to match the cooling preference of the father, the reinforcement learning model may output the set value (set temperature, wind direction, and wind speed of the air conditioner) corresponding to the cooling preference of the father on the basis of the current temperature, the target temperature, and the position of the father. Also, the processor 180 may discharge cold air toward the father at a low set temperature and a strong wind speed according to the output set value.

For another example, it is assumed that if the weather is hot, the mother approaches right up to the front of the air conditioner and prefers direct contact with the cold wind.

Also, if the state (the mother's position) is inputted into the reinforcement learning model that is trained to match the cooling preference of the mother, the reinforcement learning model may output the set value (set temperature, wind direction, and wind speed of the air conditioner) corresponding to the cooling preference of the mother on the basis of the current position of the mother. That is, if the mother is in front of the air conditioner, the air conditioner may weakly discharge air at a lower set temperature depending on the set value outputted by the reinforcement learning model.

The state may further include at least one of a current time and an action of the identified member in addition to the current temperature, the target temperature, the current set temperature, and the position of the identified member.

Particularly, the processor 180 may determine the current time using an internal timer or data received from an external device.

Also, the processor 180 may determine a behavior of the member on the basis of the data for identifying the member. For example, the processor 180 may determine that the currently identified member is doing push-ups on the basis of the captured image of the member and the received sound.

Also, the processor 180 may input the current time and the behavior of the identified member as the state into the reinforcement learning model. In this case, the reinforcement learning model may output the behavior in consideration of the current time and the behavior of the identified member in addition to the current temperature, the target temperature, the current set temperature, and the position of the identified member.

For example, it is assumed that the mother hates the direct contact with the wind discharged from the air conditioner or prefers direction contact with a large amount of very cold air when exercising. In this case, the reinforcement learning model may output the set value on the basis of the mother's behavior, and the air conditioner may discharge a low set temperature and a large amount of air toward the mother who is exercising on the basis of the output set value.

For another example, it is assumed that the mother prefers to allow the body to directly contact a large amount of cool air because of coming home after the exercise at 2 pm. In this case, the reinforcement learning model may output the set value on the basis of the behavior of the mother that comes home at the current time (at 2:00), and the air conditioner may discharge a low set temperature and a large amount of air toward the mother who is exercising on the basis of the output set value.

The processor 180 may adjust the set value of the air conditioner according to the action outputted from the reinforcement learning model.

The processor 180 may control an operation of at least one of the compressor, the fan motor, or the vane motor to adjust at least one of the set temperature, the air volume, or the wind direction of the air conditioner.

For example, the processor 180 may control an operation of the compressor 740 on the basis of the set temperature among the actions outputted by the reinforcement learning model. Also, the set temperature of the air conditioner 780 may be adjusted as the operation of the compressor 740 is controlled.

Also, the processor 180 may control the operation of the fan motor 740 on the basis of the air volume among the actions outputted by the reinforcement learning model. Also, as the operation of the fan motor 740 is controlled, the air volume of the air conditioner may be adjusted.

Also, the processor 180 may control the operation of the vane motor on the basis of the wind direction among the air-conditioning information. As the operation of the vane motor is controlled, the wind direction of the air conditioner may be adjusted.

Figure 8:
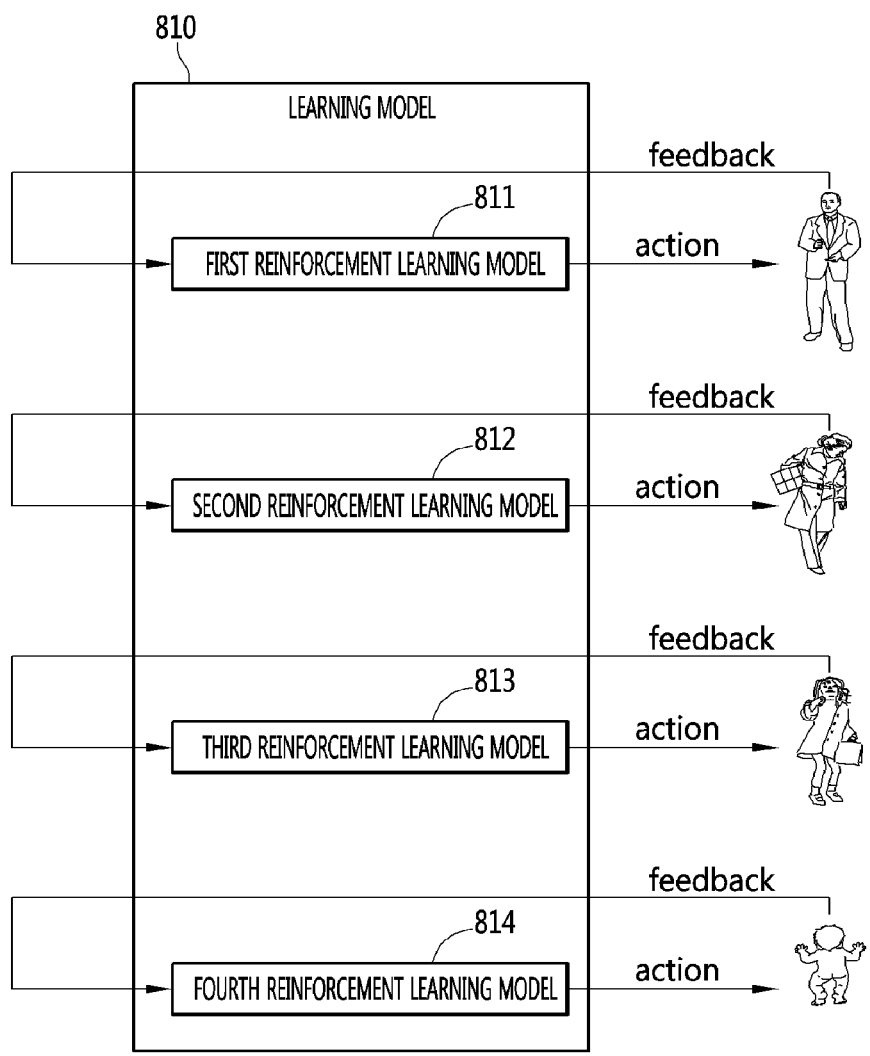
FIG. 8 is a view for explaining a re-learning method using a reinforcement learning model and feedback, which correspond to members.
Figure 9:
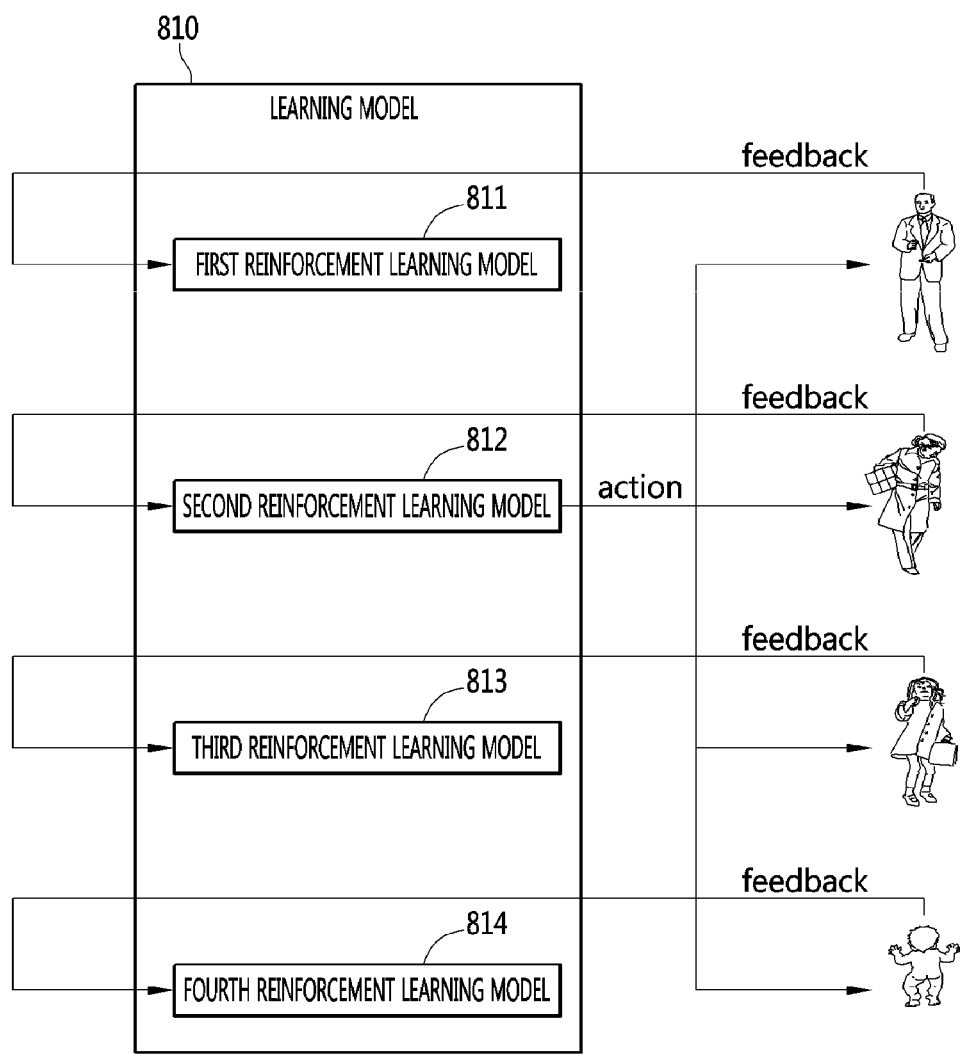
FIG. 9 is a view for explaining a method for updating the reinforcement learning model by using the feedback of a member corresponding to oneself with respect to an action of the other reinforcement learning model.

FIG. 8 is a view for explaining a re-learning method using the reinforcement learning model and the feedback, which correspond to members.

The reinforcement learning model 810 may include a plurality of reinforcement learning models, for example, a first reinforcement learning model 811, a second reinforcement learning model 812, a third reinforcement learning model 813, and a fourth reinforcement learning model 814.

Also, the plurality of reinforcement learning models 811, 812, 813, and 814 may correspond to the plurality of members, respectively.

For example, the first reinforcement learning model 811 may correspond to the father, the second reinforcement learning model 812 may correspond to the mother, the third reinforcement learning model 813 may correspond to the elementary school student daughter, and the fourth reinforcement learning Model 814 may correspond to the infant son.

The processor 180 may provide a state to the reinforcement learning model corresponding to the identified member.

For example, when the father is identified in the indoor space, the processor 180 may input at least one of the current temperature, the target temperature, the father's position in the indoor space, the current time, or the father's behavior to the first reinforcement learning model 811.

Also, when the first reinforcement learning model 811 outputs a behavior based on the state, the processor may adjust the set value of the air conditioner on the basis of the behavior.

Also, the first reinforcement learning model may be updated using the identified member's feedback on the adjusted set value.

For example, the set value of the air conditioner was adjusted to lower the set temperature, and in response to the lowered set temperature, the father said, "it's cold!". In this case, the processor 180 may receive the father's feedback through the microphone 122.

Also, the processor 180 may train the reinforcement learning model corresponding to the identified user by using the feedback of the identified user.

For example, the processor adjusting the set value of the air conditioner according to the behavior of the first reinforcement learning model corresponding to the father may provide the first reinforcement learning model with a reward or a penalty corresponding to the feedback received from the father.

In this case, the first reinforcement learning model 811 may establish a new policy on the basis of the actions outputted by the first reinforcement learning model 811, the reward or the penalty to update parameters of the first reinforcement learning model 811 to correspond to the new policy.

The memory 170 may store a plurality of learning results respectively corresponding to the plurality of members. Here, as described above, the learning results are parameters of the neural network that is updated by using the behavioral and behavioral feedback of the reinforcement learning model.

That is, when the first reinforcement learning model 811 corresponding to the father is trained using the father's feedback, the learning results corresponding to the father, that is, the parameters of the first reinforcement learning model 811 may be updated.

Other reinforcement learning models 812, 813, and 814 may also be trained using the output and the feedback in the same manner. Thus, learning results corresponding to other members may also be updated.

For example, when the mother is identified in the indoor space, the processor 180 may input at least one of the current temperature, the target temperature, the position of the mother in the indoor space, the current time, or the father's behavior to the second reinforcement learning model 812.

Also, when the second reinforcement learning model 812 outputs a behavior based on the state, the processor may adjust the set value of the air conditioner on the basis of the behavior.

Also, the second reinforcement learning 812 may be updated using the mother's feedback on the adjusted set value.

In this case, the second reinforcement learning model 812 may establish a new policy on the basis of the actions outputted by the second reinforcement learning model 812, the reward or the penalty to update parameters of the second reinforcement learning model 812 to correspond to the new policy.

In this case, the learning results corresponding to the mother, that is, the parameters of the second reinforcement learning model 812 may be updated.

The feedback of a particular member may include not only the behavior or voice of the specific member, but also the behavior or voice of another member.

For example, when the mother says "child is cold" or "our child is cold," the processor may recognize the mother's voice as the feedback of the infant son, not the mother's feedback.

A specific reinforcement learning model may be updated using the feedback of the member corresponding to oneself with respect to the behavior of another reinforcement learning model.

This will be described with reference to FIG. 9.

It is assumed that there are the father, the mother, the elementary school student daughter, and the infant son in the indoor space, and it is assumed that the set value of the air conditioner is adjusted based on the behavior of the first reinforcement learning model 811 corresponding to the father.

Also, if the feedback of the father and the other member is received after adjusting the set value based on the behavior of the first reinforcement learning model 811, the processor may update the second reinforcement learning model corresponding to the other member by using the feedback of the other member.

For example, when the set value is adjusted in consideration of the father's cooling preference according to the behavior of the first reinforcement learning model 811, the mother's feedback, i.e., "Honey. Cold!" may be received.

Since the first reinforcement learning model 811 is a model for predicting a cooling method suitable for the father, the mother feedback should not be used in the first reinforcement learning model 811.

However, since the second reinforcement learning model 812 is a model for predicting a cooling method suitable for the mother, the mother's feedback may be data for evolving the second reinforcement learning model 812.

Thus, the processor 180 may update the second reinforcement learning model 812 corresponding to the mother on the basis of the mother's feed corresponding to the state inputted in the first reinforcement learning model, the action of the first reinforcement learning model (that is, the set value outputted by the first reinforcement learning model), and the action of the first reinforcement learning model.

Next, a method for providing the feedback to the reinforcement learning model will be described in more detail.

Figure 10:
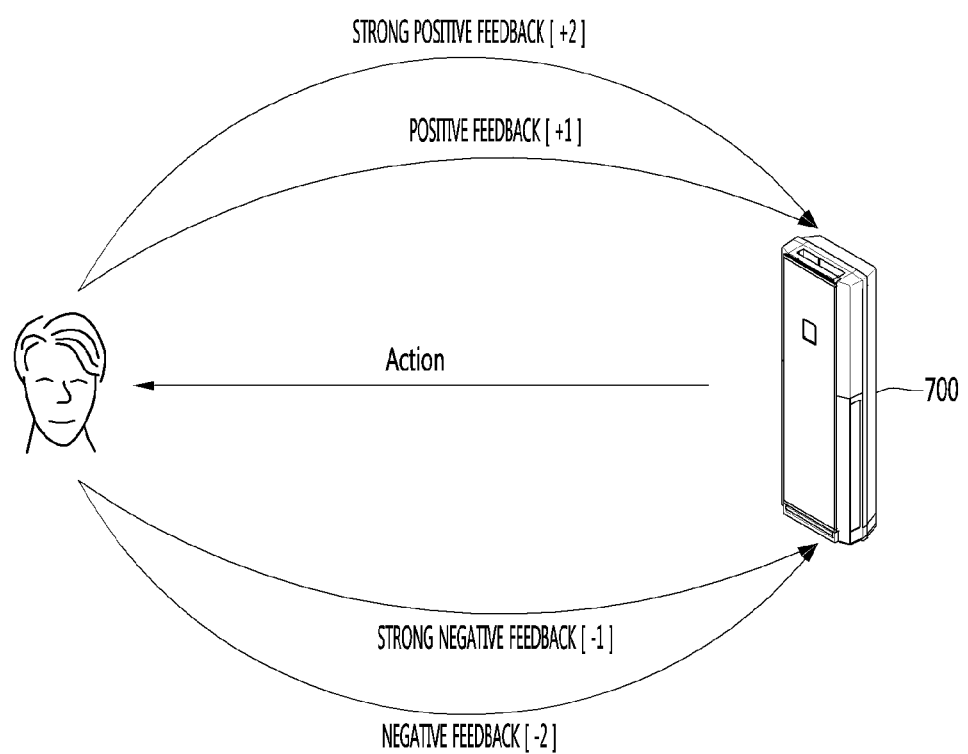
FIG. 10 is a view for explaining a method for providing feedback to the reinforcement learning model according to an embodiment of the present invention.

FIG. 10 is a view for explaining a method for providing feedback to the reinforcement learning model according to an embodiment of the present invention.

The feedback may be obtained based on at least one of the user's voice, the user's behavior, or the readjustment of the set value by the user's input.

Also, the feedback may include positive feedback indicating a positive response and negative feedback indicating a negative response with respect to the set value recommended by the reinforcement learning model.

Here, the positive feedback may be a positive representation of the set value of the air conditioner. For example, the positive feedback may include non-reception of an input for re-adjusting the set value in response to a voice such as "it's like", "it's cool", or the like, a satisfactory facial expression, the voice or action preset as the positive feedback, or the set value of the air conditioner.

Also, the negative feedback may be a negative representation of the set value of the air conditioner. For example, the negative feedback may include reception of the input for re-adjusting the set value in response to a voice such as "it's very cold!", an action that wraps the body with cold hands, the voice or action that is preset as the negative feedback, or the adjustment of the set value of the air conditioner.

The processor may give a reward to the reinforcement learning model when the user feedback is the positive feedback and may give a reward to the reinforcement learning model when the user feedback is the negative feedback.

A level of the reward may correspond to strength of the positive feedback. Particularly, the processor may give different levels of the reward according to the strength of the positive feedback.

For example, the processor may give a first level (for example, +1) of the reward when a voice that is "Oh! Okay!" is received and give a second level (for example, +2) of the reward when a voice that is "Oh! So good!" is received.

Also, the reinforcement learning model may perform reinforcement learning based on the levels of the reward.

The levels of the reward may correspond to the strength of the negative feedback. Particularly, the processor may give different levels of the penalty according to the strength of the negative feedback.

For example, the processor may give a first level (for example, +1) of the penalty when a voice that is "little cold" is received and give a second level (for example, +2) of the penalty when a voice that is "why is it so cold?" is received.

Also, the reinforcement learning model may perform reinforcement learning based on the levels of the penalty.

The strength of the positive feedback or the strength of the negative feedback may be determined based on a time taken to receive the positive feedback or the negative feedback after the air conditioner adjusts the set value.

For example, it is assumed that the set value is adjusted so that the discharge air is transferred directly to the member at a low set temperature.

Rather than expressing the member "cold" after ten minutes after the set value has been adjusted, it may be a higher intensity negation to express the member "cold" as soon as the set value is adjusted.

Thus, the processor may adjust the levels of the reward or penalty based on the time taken to receive the positive feedback or the negative feedback after adjusting the set value.

The feedback has been described as including the re-adjustment of the set values by the user input.

In this case, the processor may adjust the levels of the penalty based on the extent to which the member re-adjusts the set value.

It is assumed that the set value is adjusted so that the discharge air is transferred directly to the member at a low set temperature.

If a difference between the desired temperature and the discharge temperature of the air conditioner is large, the member may adjust the current set temperature relatively much by operating the remote controller. On the other hand, if the difference between the desired temperature and the discharge temperature of the air conditioner is small, the member may adjust the current set temperature relatively slightly by operating the remote controller.

For another example, if the difference between the desired wind direction and the wind direction set in the air conditioner is large, the member may control the wind direction relatively much by operating the remote controller. On the other hand, if the difference between the desired wind direction and the wind direction set in the air conditioner is small, the member may adjust the wind direction relatively little by operating the remote controller.

Thus, the processor may give a first level (e.g., +1) of the penalty when the member re-adjusts the set value of the air conditioner by a first degree and may give a second level (e.g., +2) of the penalty when the member re-adjusts the set value of the air conditioner by a second degree greater than the first degree.

As described above, according to the present invention, there may be the advantage that the cooling is capable of being performed in consideration of the cooling preference of the members present in the indoor space.

Also, according to the present invention, there may be the advantage that various levels of the reward or penalty are given by using the feedback on the reaction of the members to perform the reinforcement learning and to recommend the cooling method by accurately reflecting the tendency of the user.

Also, according to the present invention, there may be the advantage that the reinforcement learning is continuously performed whenever the cooling is performed to continuously enhance the performance of the reinforcement learning model.

Figure 11:
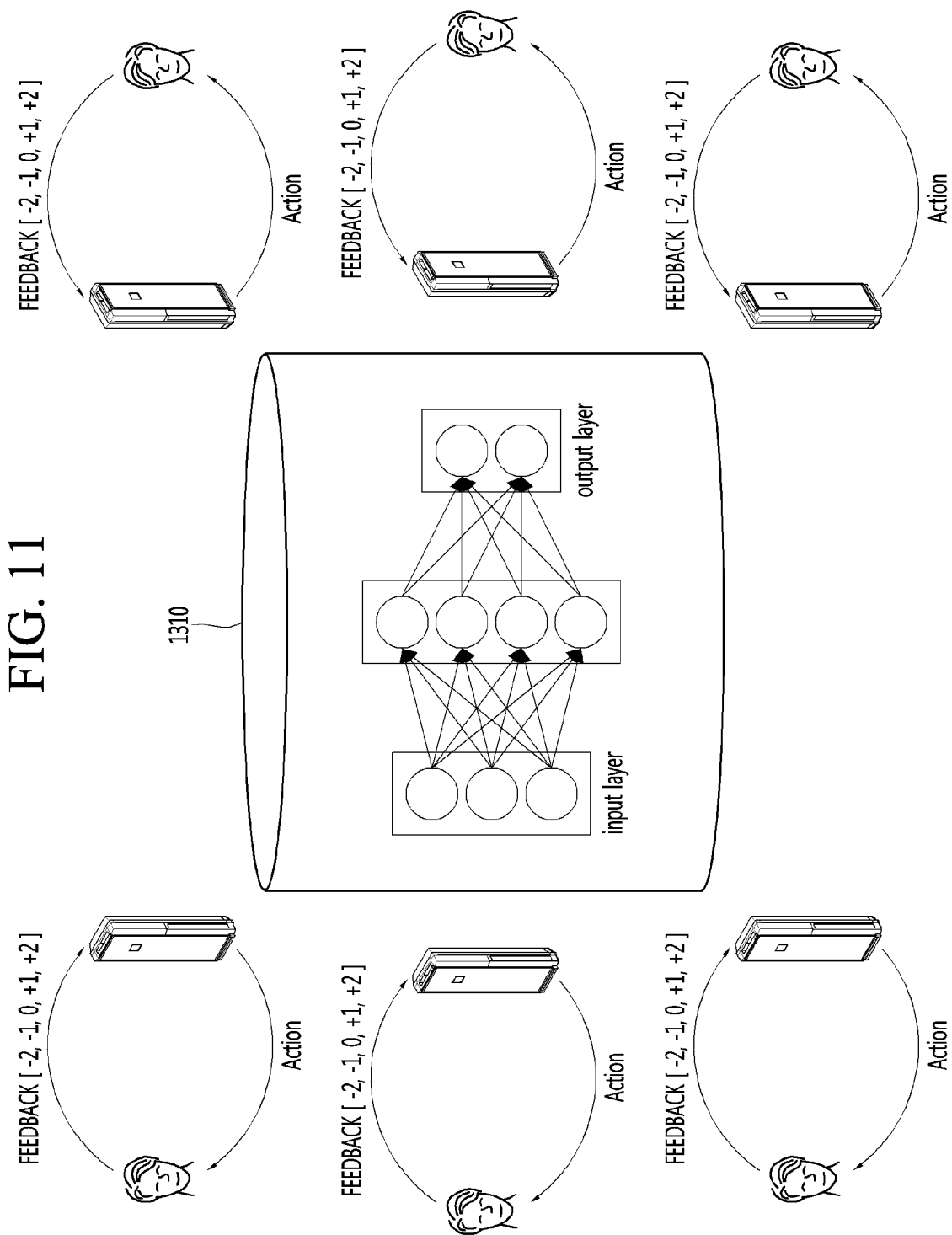
FIG. 11 is a view for explaining a method for pre-training the reinforcement learning model according to an embodiment of the present invention.

FIG. 11 is a view for explaining a method for previously training the reinforcement learning model according to an embodiment of the present invention.

The reinforcement learning model mounted on the air conditioner may be pre-trained. Here, the pre-trained may mean that the reinforcement learning model has been pre-trained by the manufacturer or other organization.

The reinforcement learning model may be pre-trained using feedback of a plurality of users obtained based on a cloud service.

Particularly, the cloud server 1310 may receive feedback of a user corresponding to a state when cooling, an action of the reinforcement learning model, and an action of the reinforcement learning model.

In this case, the cloud server 1310 may provide reinforcement learning by providing at least one of a state during cooling, an action of the reinforcement learning model, or user feedback corresponding to the action of the reinforcement learning model to pre-train the reinforcement learning model.

If the reinforcement learning model is pre-trained in this manner, the pre-trained reinforcement learning model may be newly installed in the air conditioner or replace the existing reinforcement learning model in the air conditioner.

The reinforcement learning model may be pre-trained using the feedback of the plurality of users corresponding to the genders and ages of the members corresponding to the reinforcement learning model.

Particularly, the first reinforcement learning model corresponding to the father may be pre-trained by using the feedback from user having a similar gender and age as the father among the feedback of the plurality of users obtained based on the cloud service.

Also, the second reinforcement learning model corresponding to the mother may be pre-trained by using the feedback from user having a similar gender and age as the mother among the feedback of the plurality of users obtained based on the cloud service.

When the pre-trained reinforcement learning model is loaded into the air conditioner, the processor may train the pre-trained reinforcement learning model by using the feedback of identified member.

For example, after the first reinforcement learning model, which is pre-trained with the feedback from the users having the similar gender and age as the father, is loaded, the processor may train the first reinforcement learning model by using the father's feedback.

For another example, after the third reinforcement learning model, which is pre-trained with the feedback from the users whose gender and age are similar to those of the elementary student daughter, is loaded, the processor may train the third reinforcement learning model by using the feedback of the elementary student daughter.

As described above, the method of pre-training reinforcement learning models increases exponentially in learning data. Also, since the reinforcement learning models are pre-trained in consideration of the cooling preferences of the users having the similar ages and ages, it has the advantage of reducing the time to establish the best policy after the reinforcement learning model is loaded into the air conditioner.

Figure 12:
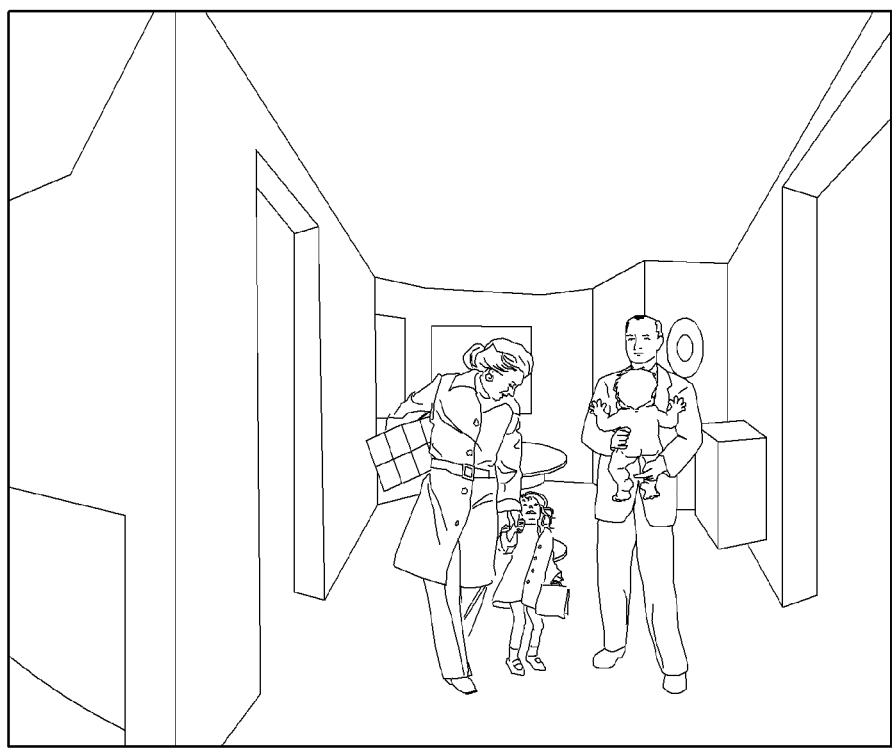
FIG. 12 is a view for explaining a method for adjusting a set value when a plurality of members are present in an indoor space.

FIG. 12 is a view for explaining a method for adjusting the set value when the plurality of members are present in the indoor space.

When two or more members are identified in the indoor space, the processor may adjust the set value on the basis of the behavior of the reinforcement learning model corresponding to the member having the highest priority among the plurality of members.

Particularly, the cooling preference of the members may conflict with each other.

For example, the father may like a low set temperature and a high airflow, but the mother may not.

For another example, if the mother is holding the baby, the mother prefers to directly contact wind of the air conditioner directly, but the baby may not like to directly contact the wind of the air conditioner.

Thus, when the two or more members are identified in the indoor space, the processor may adjust the set value of the air conditioner on the basis of the behavior of the reinforcement learning model corresponding to the member having the highest priority among the plurality of members.

For example, it is assumed that the priority are preset in order of the infant son, the elementary school student daughter, the mother, and the father.

Also, if the mother and the infant son exist in the indoor space, the processor 180 may provide a state to the fourth reinforcement learning model corresponding to the infant son. Also, when the fourth reinforcement learning model outputs an action, the processor 180 may adjust a set value of the air conditioner on the basis of the action outputted by the fourth reinforcement learning model.

Also, if the mother and the father exist in the indoor space, the processor 180 may provide a state to the second reinforcement learning model corresponding to the mother. Also, when the second reinforcement learning model outputs an action, the processor 180 may adjust a set value of the air conditioner based on the action outputted by the second reinforcement learning model.

There may be members who are sensitive to the cooling method, and there may be members who are not sensitive to the cooling method.

For example, the infants are more likely to catch cold if they are cold or directly contact the wind. For another example, the elementary school student's daughter who gets a lot of heat may be annoyed if the cooling is done according to her preference.

For another example, the mother who does not get hot may adapt well to any type of cooling Thus, the present invention may be advantageous in that the priority of the plurality of members is set, and the cooling preference is considered according to the priority to maximally satisfy the plurality of members.

The cooling according to the above-described priority may or may not be applied depending on the use of the space in which the air conditioner is installed.

It is assumed that the air conditioner is installed in a common space used by all members in the home such as a living room. In this case, when two or more members are identified in the common space, the processor may adjust the set value on the basis of the behavior of the reinforcement learning model corresponding to the higher priority member among the plurality of members.

However, it is assumed that the air conditioner is installed in a private space such as a father's study. Also, the father's library is mainly used by the father and is assumed to be in and out of elementary school daughters.

The father's library may be a father's personal space, and thus, the cooling should be carried out according to the father's cooling preference. However, even if the elementary school daughter enters the library for a while, it is inappropriate to perform the air-conditioning according to the cooling preference of the elementary school student daughter according to the priority described above.

Thus, the processor may determine whether the space where the air conditioner is installed is a public space or a private space.

Particularly, the processor may determine whether the indoor space in which the air conditioner is installed is the public space or the personal space on the basis of at least one of a frequency with which the members are identified or a period during which the members are identified, For another example, the processor may determine whether the indoor space in which the air conditioner is installed is the public space or the private space on the basis of the user's input for setting up the public space or the private space.

Also, if the space in which the air conditioner is installed is determined to be the common space, and two or more members are identified in the common space, the processor may adjust the set value on the basis of the behavior of the reinforcement learning model corresponding to the higher priority member of the plurality of members.

If the space in which the air conditioner is installed is determined to be the personal space, the processor may determine the main member on the basis of at least one of the frequency with which the members are identified or the period during which the members are identified. For another example, the processor may determine the main member on the basis of the user's input when the user's input for setting the main member is received.

Here, the main member may represent a member who mainly uses the space where the air conditioner is installed.

Also, when the main member of the indoor space is determined, and the two or more members are identified in the indoor space, the processor may adjust the set value according to the behavior of the reinforcement learning model corresponding to the main member.

Particularly, although a first member and a second member are identified in a first member's personal space, and the priority of the second member is higher than that of the first member, the processor may provide a state to the reinforcement learning model corresponding to the first member and adjust the set value of the air conditioner according to the behavior of the reinforcement learning model corresponding to the first member.

As described above, according to the present invention, a cooling system that best meets the use of the space, in which the air conditioner is installed, and the user's intension according to the use of the space may be provided.

A method for operating the air conditioner disposed in the indoor space will be described. A method for operating an air conditioner disposed in an indoor space includes acquiring data through which members are identified, identifying at least one member that is present in the indoor space among a plurality of members by using the data through which the members are identified, controlling an operation of at least one of a compressor, a fan motor blowing air, or a vane motor operating a discharge vane provided to be movable in a discharge hole on the basis of learning results corresponding to the identified member to adjust a set value including at least one of a set temperature, an air volume, or a wind direction, and updating the learning result by using feedback on the adjusted set value.

In this case, the learning result may be a parameter of the reinforcement learning model updated using the feedback.

In this case, the adjusting of the set value may include providing a state to the reinforcement learning model and adjust the set value according to an action when the reinforcement learning model outputs the action on the basis of the state, the updating of the learning results may include training the reinforcement learning model by using the feedback on the adjusted set value, and the state may include at least one of a current temperature, a target temperature, or a position of the identified member.

In this case, the state may further include at least one of a current time or an action of the identified member.

The training of the reinforcement learning model may include giving a reward to the reinforcement learning model when the feedback is positive feedback, and giving a penalty to the reinforcement learning model when the feedback is negative feedback, wherein a level of the reward may correspond to strength of the positive feedback, and a level of the penalty may correspond to strength of the negative feedback.

The giving of the reward to the reinforcement learning model may include adjusting the level of the reward on the basis of a time taken to receive the positive feedback after adjusting the set value, and the giving of the penalty to the reinforcement learning model may include adjusting the level of the penalty on the basis of a time taken to receive the negative feedback after adjusting the set value.

The negative feedback may include readjustment of the set value, and the giving of the penalty to the reinforcement learning model may include adjusting the level of the penalty on the basis of a degree of the readjustment of the set value.

The above-described present invention may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include a processor 180 of a server. Thus, the detailed description is intended to be illustrative, but not limiting in all aspects. It is intended that the scope of the present invention should be determined by the rational interpretation of the claims as set forth, and the modifications and variations of the present invention come within the scope of the appended claims and their equivalents.

The invention claimed is:

1. An air conditioner disposed in an indoor space, the air conditioner comprising:
   a compressor;
   a casing comprising a suction hole and a discharge hole;
   a fan motor installed within the casing to blow air;
   a discharge vane provided to be movable in the discharge hole;
   a vane motor configured to operate the discharge vane;
   a sensor configured to acquire data through which a plurality of members are identified;
   a memory configured to store a plurality of model parameters of a plurality of reinforcement learning models, the plurality of model parameters of the plurality of reinforcement learning models being set to correspond to the plurality of members, respectively; and
   a processor,
   wherein the processor is configured to:
   identify a first member and a second member different from the identified first member that are present in the indoor space among the plurality of members by using the data through which the plurality of members are identified,
   control operation of at least one of the compressor, the fan motor, or the vane motor based on a first model parameter of a first reinforcement learning model corresponding to the identified first member among the plurality of model parameters of the plurality of reinforcement learning models so as to adjust a set value, the set value comprising at least one of a set temperature, an air volume, or a wind direction, and
   change the first model parameter of the first reinforcement learning model corresponding to the identified first member based on feedback on the adjusted set value and feedback of the identified first member when operating at least one of the compressor, the fan motor, or the vane motor, and
   wherein the feedback of the identified first member includes voice or behavior of the identified first member and includes voice or behavior of the identified second member when operating at least one of the compressor, the fan motor, or the vane motor.

2. The air conditioner according to claim 1, wherein the processor is configured to:
   provide a state to the first reinforcement learning model,
   adjust the set value according to an action when the first reinforcement learning model outputs the action based on the state, and
   train the first reinforcement learning model by using the feedback on the adjusted set value,
   wherein the state comprises at least one of a current temperature, a target temperature, or a position of the identified first member.

3. The air conditioner according to claim 2, wherein the state further comprises at least one of a current time or an action of the identified first member.

4. The air conditioner according to claim 2, wherein the processor is configured to:
   provide the state to the first reinforcement learning model corresponding to the identified first member,
   adjust the set value based on an action when the first reinforcement learning model outputs the action based on the state, and
   change the first model parameter of the first reinforcement learning model by using the feedback of the identified first member on the adjusted set value.

5. The air conditioner according to claim 4, wherein the processor is configured to change a second model parameter of a second reinforcement learning model corresponding to the identified second member by using feedback of the identified second member when operating at least one of the compressor, the fan motor, or the vane motor based on the action of the first reinforcement learning model,
 wherein the feedback of the identified second member includes the voice or the behavior of the identified second member and includes the voice or the behavior of the identified first member when operating at least one of the compressor, the fan motor, or the vane motor.

6. The air conditioner according to claim 2, wherein the processor is configured to:
 give a reward to the first reinforcement learning model when the feedback is positive feedback, and
 give a penalty to the first reinforcement learning model when the feedback is negative feedback,
 wherein a level of the reward corresponds to strength of the positive feedback, and
 wherein a level of the penalty corresponds to strength of the negative feedback.

7. The air conditioner according to claim 6, wherein the processor is configured to adjust the level of the reward or the penalty based on a time taken to receive the positive feedback or the negative feedback after adjusting the set value.

8. The air conditioner according to claim 6, wherein the negative feedback comprises readjustment of the set value, and
 wherein the processor is configured to adjust the level of the penalty based on a degree of the readjustment of the set value.

9. The air conditioner according to claim 2, wherein the first reinforcement learning model is pre-trained by using feedback of a plurality of users, which is acquired based on a cloud service, and
 wherein the processor is configured to train the pre-trained first reinforcement learning model by using the feedback of the identified first member.

10. The air conditioner according to claim 1, wherein, when two or more members are identified, the processor is configured to adjust the set value based on an action of a third reinforcement learning model corresponding to a third member having a high priority among the plurality of members.

11. The air conditioner according to claim 10, wherein the processor is configured to determine the indoor space as a common space, and when the two or more members are identified, the processor is configured to adjust the set value based on the action of the third reinforcement learning model corresponding to the third member having a high priority among the plurality of members.

12. The air conditioner according to claim 2, wherein the processor is configured to determine as a fourth member as a main member in the indoor space, and when two or more members are identified in the indoor space, the processor is configured to adjust the set value according to an action of a fourth reinforcement learning model corresponding to the main member.

13. A method for operating an air conditioner disposed in an indoor space, the method comprising:
 acquiring data through which a plurality of members are identified;
 identifying a first member and a second member different from the identified first member that are present in the indoor space among the plurality of members by using the data through which the plurality of members are identified;
 controlling an operation of at least one of a compressor, a fan motor blowing air, or a vane motor operating a discharge vane provided to be movable in a discharge hole based on a first model parameter of a first reinforcement learning model corresponding to the identified first member among a plurality of model parameters of a plurality of reinforcement learning models to adjust a set value, the set value comprising at least one of a set temperature, an air volume, or a wind direction,
 wherein the plurality of model parameters of the plurality of reinforcement learning models are set corresponding to the plurality of members, respectively; and
 changing the first model parameter of the first reinforcement learning model corresponding to the identified first member based on feedback on the adjusted set value and feedback of the identified first member when operating at least one of the compressor, the fan motor, or the vane motor,
 wherein the feedback of the identified first member includes voice or behavior of the identified first member and includes voice or behavior of the identified second member when operating at least one of the compressor, the fan motor, or the vane motor.

14. The method according to claim 13, wherein the adjusting of the set value comprises:
 providing a state to the first reinforcement learning model; and
 adjusting the set value according to an action when the first reinforcement learning model outputs the action based on the state,
 wherein the changing the first model parameter of the first reinforcement learning model comprises training the first reinforcement learning model by using the feedback on the adjusted set value, and
 wherein the state comprises at least one of a current temperature, a target temperature, or a position of the identified first member.

15. The method according to claim 14, wherein the state further comprises at least one of a current time or an action of the identified first member.

16. The method according to claim 14, wherein the training of the first reinforcement learning model comprises:
 giving a reward to the first reinforcement learning model when the feedback is positive feedback; and
 giving a penalty to the first reinforcement learning model when the feedback is negative feedback,
 wherein a level of the reward corresponds to strength of the positive feedback, and
 wherein a level of the penalty corresponds to strength of the negative feedback.

17. The method according to claim 16, wherein the giving of the reward to the first reinforcement learning model comprises adjusting the level of the reward based on a time taken to receive the positive feedback after adjusting the set value, and
 wherein the giving of the penalty to the first reinforcement learning model comprises adjusting the level of the penalty based on a time taken to receive the negative feedback after adjusting the set value.

18. The method according to claim 16, wherein the negative feedback comprises readjustment of the set value, and wherein the giving of the penalty to the first reinforcement learning model comprises adjusting the level of the penalty based on a degree of the readjustment of the set value.

\* \* \* \* \*